(12) United States Patent
Mori et al.

(10) Patent No.: US 6,707,615 B2
(45) Date of Patent: Mar. 16, 2004

(54) OPTICAL PICKUP APPARATUS RESTRICTING ABERRATION AND OPTICAL DISC APPARATUS USING THE SAME

(75) Inventors: Taiichi Mori, Koga (JP); Hiroshi Goto, Munakata (JP); Fuminobu Furukawa, Onojo (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/978,596

(22) Filed: Oct. 18, 2001

(65) Prior Publication Data

US 2002/0048249 A1 Apr. 25, 2002

(30) Foreign Application Priority Data

Oct. 25, 2000 (JP) ........................ 2000-325324

(51) Int. Cl.[7] ........................ G02B 27/12; G02B 27/14; G11B 7/00
(52) U.S. Cl. ..................... 359/641; 359/637; 369/44.23
(58) Field of Search ................. 359/641, 618, 359/619, 629, 636–639; 369/44.23, 44.24, 12.01, 112.06, 112.01

(56) References Cited

U.S. PATENT DOCUMENTS

| | | | |
|---|---|---|---|
| 6,108,139 A | * 8/2000 | Takahashi | 359/719 |
| 6,115,349 A | 9/2000 | Tawa et al. | |
| 6,147,947 A | 11/2000 | Sofue | |
| 6,240,053 B1 | 5/2001 | Akiyama | |
| 6,337,841 B1 | * 1/2002 | Kim et al. | 369/112.06 |
| 6,343,058 B1 | 1/2002 | Akiyama et al. | |
| 6,411,587 B1 | * 6/2002 | Arai et al. | 369/44.23 |
| 6,418,108 B1 | * 7/2002 | Ueda et al. | 369/112.23 |
| 6,480,455 B2 | 11/2002 | Takahashi | |
| 2002/0064121 A1 | 5/2002 | Takahashi | |

FOREIGN PATENT DOCUMENTS

| | | |
|---|---|---|
| JP | 9204684 | 8/1997 |
| JP | 10154344 | 6/1998 |
| JP | 10255306 | 9/1998 |
| JP | 10312574 | 11/1998 |
| JP | 11134706 | 5/1999 |
| JP | 200082232 | 3/2000 |
| JP | 200090470 | 3/2000 |
| JP | 2000132859 | 5/2000 |
| JP | 2000251307 | 9/2000 |

* cited by examiner

*Primary Examiner*—Scott J. Sugarman
*Assistant Examiner*—Alicia M. Harrington
(74) *Attorney, Agent, or Firm*—Stevens, Davis, Miller & Mosher, LLP.

(57) ABSTRACT

An optical recording/reproducing apparatus has a light source that radiates a laser beam, an optical detector that detects reflected light from the optical disc, a collimator lens that converts the radiated light of the light source into a fine divergent pencil of rays, and an objective lens that focuses these rays on the optical disc. The collimator lens has a surface that is curved to form a wavefront shape that increasingly corrects a coma aberration of the radiated light in correspondence to a radial distance between the center of the collimator lens and a position at which the radiated light intersects the collimator lens.

12 Claims, 8 Drawing Sheets

CENTER OF OPTICAL AXIS

LENS SHIFT

OPTICAL PICKUP APPARATUS RESTRICTING ABERRATION AND OPTICAL DISC APPARATUS USING THE SAME

BACKGROUND OF THE INVENTION

1. Field of the Invention

The present invention relates to an optical pickup apparatus used for recording and reproducing on an optical disc, an optical pickup apparatus using light sources having different wavelengths for the purpose of corresponding to recording mediums having different recording densities and an optical disc apparatus using the optical pickup apparatus.

2. Description of the Related Art

An optical recording medium has become rapidly popular because advantages that a recording capacity thereof is great and a treatment is easily executed are recognized. Further, in order to increase a recording capacity, various kinds of recording mediums have been proposed. On the other hands, a demand of a disc apparatus capable of corresponding to these kinds of recording mediums has been increased. In response to the demand mentioned above, an optical pickup disclosed in JP-A-10-154344 has been proposed as an optical structure using light sources having two kinds of different wavelengths.

Long and short of it is that two kinds of light sources having the different wavelengths are prepared, an objective lens corresponding to an optical performance of a high density recording medium is provided, and the same objective lens is commonly used for a low density recording medium by forward shifting a position of a light source having a long wavelength so as to set an incident light flux to the objective lens to a fine divergent light.

However, since a medium capable of recording as a low density recording medium is going to be supplied to a market, there is a limit for recording under an optimum condition only by a structure of commonly using the objective lens. In particular, since the incident light to the objective lens is the fine divergent light in the low density recording medium, a coma aberration caused by a displacement of an optical axis is increased at a time of shifting (particularly shifting a tracking of) the objective lens, so that a considerable influence is applied to recording a signal recorded on the medium (including both of the case of simply reproducing and the case of reproducing a control signal required for recording).

SUMMARY OF THE INVENTION

Accordingly, the present invention is made for the purpose of solving the problem mentioned above, and an object of the present invention is to provide an optical pickup apparatus which can reproduce a high-quality signal from a medium even in a state of maintaining a simple optical structure of the optical pickup disclosed in the technology mentioned above, and an optical disc apparatus using the optical pickup apparatus.

In accordance with the present invention, there is provided an optical pickup apparatus reproducing a recording information of an optical disc or recording the information comprising:

an optical unit having a light source radiating a laser beam and an optical detector detecting a reflected light from the optical disc;

a collimator lens converting the radiated light of the light source into a fine divergent pencil of rays; and an objective lens, wherein the collimator lens forms a wavefront shape forming a fine divergent light and a wavefront shape correcting a coma aberration, and the wavefront shape correcting the coma aberration is formed in a wavefront shape correcting more coma aberration in correspondence to an increase of radius of the collimator lens.

In accordance with the present invention, it is possible to restrict a generation of the coma aberration even when the objective lens is shifted, so that a jitter generated together with the lens shift is not increased, and a tracking error (TE) signal can be maintained with a high quality. As a result, an accuracy of recording position is improved, a loss of an optical power is restricted at a time of recording, and an excellent optical pickup apparatus can be obtained.

DESCRIPTION OF THE PREFERRED EMBODIMENTS

A description will be given below of embodiments in accordance with the present invention with reference to the accompanying drawings. In this case, in order to simplify the description so as to easily understand, a description will be given of the case that DVD and CD are respectively employed as an example of a high density recording medium and an example of a low density recording medium. A thickness of the DVD is 1.2 mm, and a thickness from a lower surface (a front surface) to a recording layer thereof is 0.6 mm. On the other hand, in the CD, a thickness of the medium and a thickness from a lower surface (a front surface) to a recording layer are both 1.2 mm.

(Embodiment 1)

Figure 1:
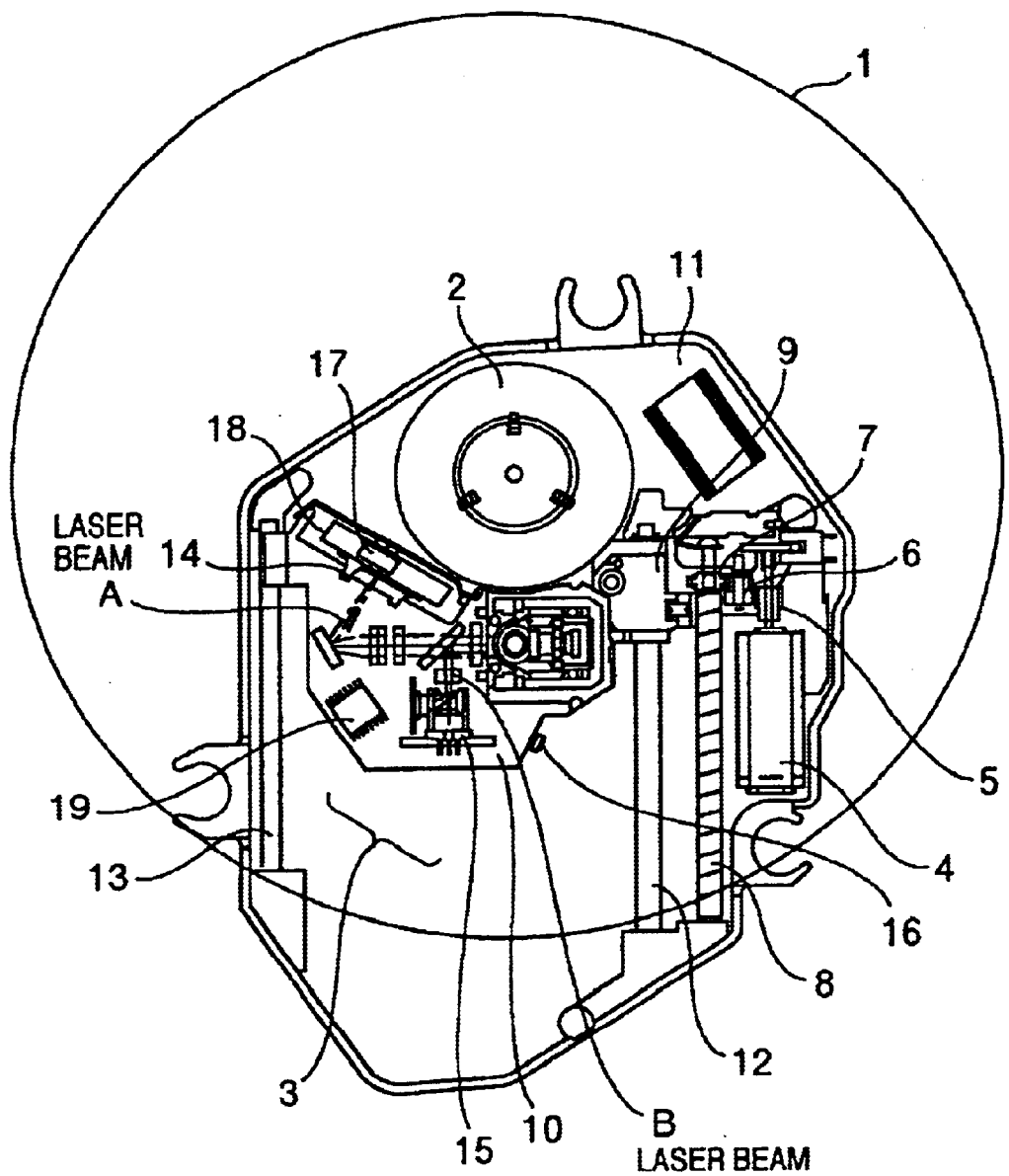
FIG. 1 is a plan view of a whole of an optical pickup module using an optical pickup apparatus in accordance with an embodiment of the present invention.
Figure 2:
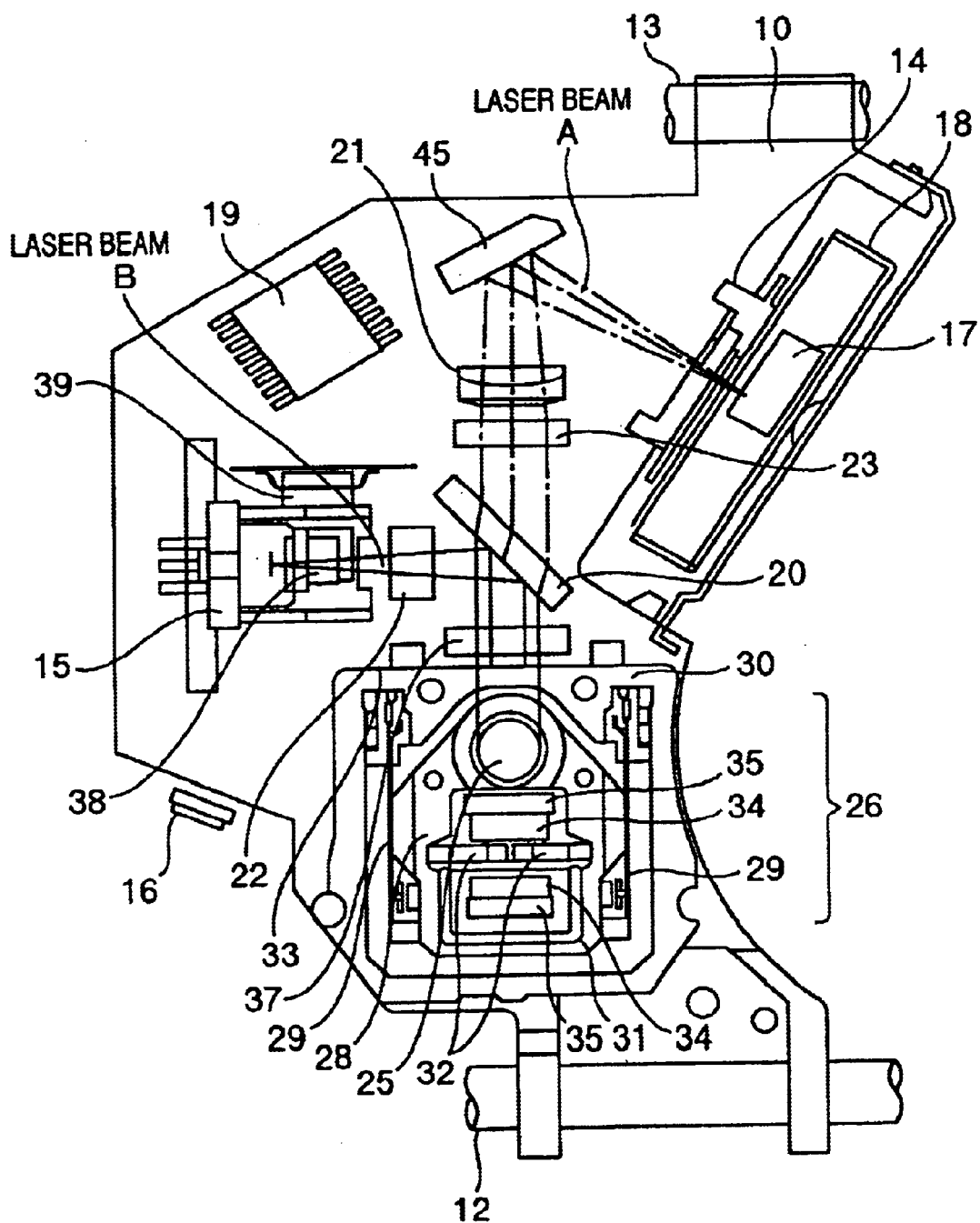
FIG. 2 is an enlarged view of a whole of a carriage in FIG. 1.
Figure 3:
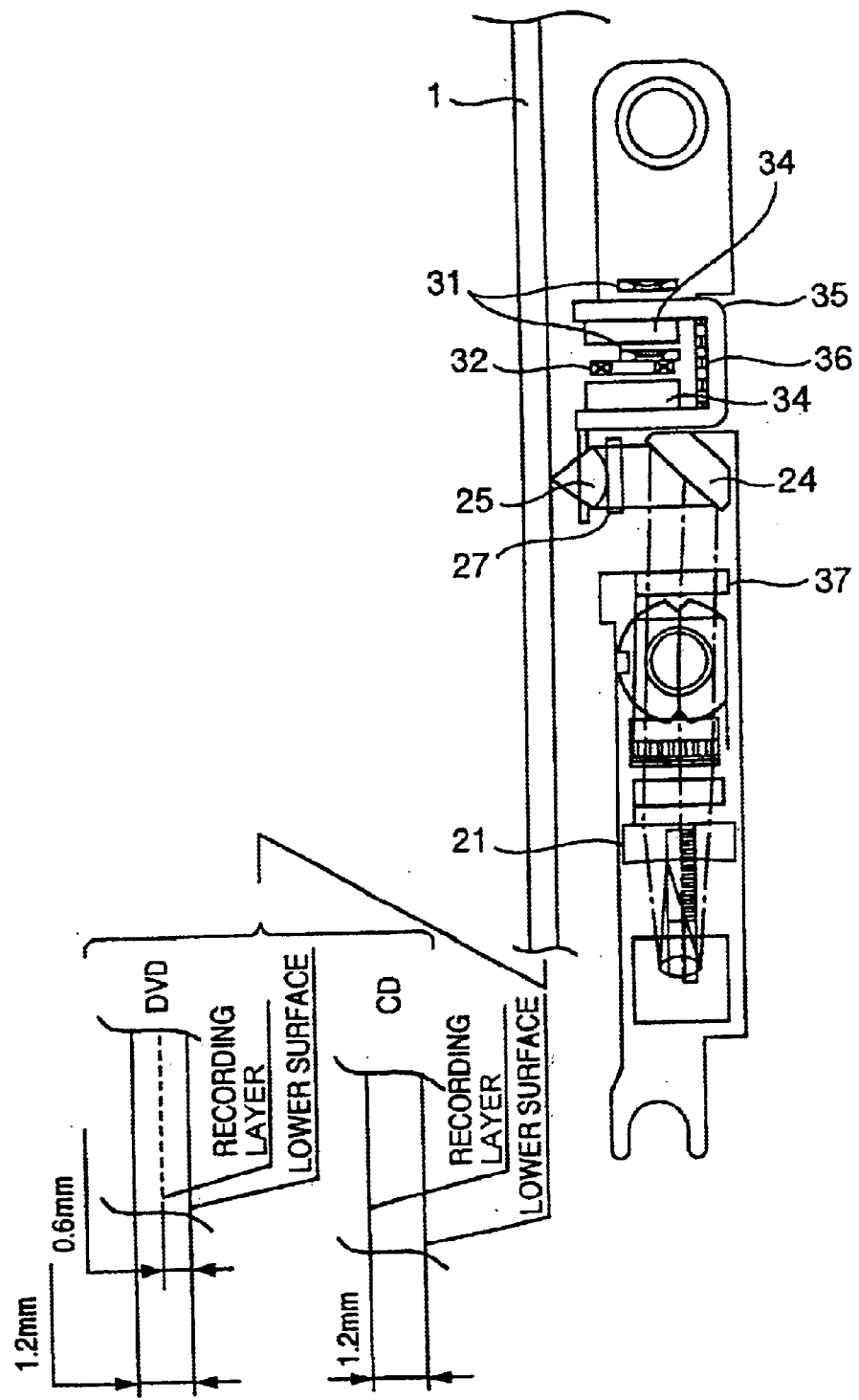
FIG. 3 is a cross sectional view along a line of an optical axis of a laser beam A in FIG. 2.

At first, a description will be given of an optical pickup apparatus. FIG. 1 is a plan view of a whole of an optical pickup module using an optical pickup apparatus in accordance with the present invention. FIG. 2 is an enlarged view of a whole of a carriage in FIG. 1, and FIG. 3 is a cross sectional view along a line of an optical axis of a laser beam A in FIG. 2. In FIGS. 1 to 3, reference numeral 1 denotes an optical disc. The optical disc can employ a high density optical disc (DVD) in which a thickness from a lower surface (a front surface) to a recording surface is about 0.6 mm, and a low density optical disc (CD) in which a thickness to a recording surface is about 1.2 mm. Reference numeral 2 denotes a motor portion. The motor portion 2 includes a turn table mounting the optical disc 1 thereon and a cramp mechanism for cramping the optical disc 1, and rotates the optical disc 1. Reference numeral 3 denotes an optical pickup. The optical pickup gives a generic name to an optical system for optically reading (reproducing) a recorded information of the optical disc 1 or recording it on the optical disc 1, and an actuator 26 for making an objective lens mentioned below follow to the optical disc 1.

Next, reference numeral 4 denotes a feed motor. A motor gear 5 is mounted to an output shaft of the feed motor 4. Further, a train gear 6 engaging with the motor gear 5 so as to reduce a rotational speed of the feed motor 4, and a shaft gear 7 engaged with the train gear 6 are engaged therewith. A spiral groove is formed on an outer periphery of a screw shaft 8 to which the shaft gear 7 is fixed. A rack 9 is engaged with the spiral groove of the screw shaft 8. The rack 9 is elastically mounted to a carriage 10 via a spring property.

Further, a support shaft 12 and a guide shaft 13 which are arranged on a module base 11 are inserted to the carriage 10, and the carriage 10 can move in a radial direction of the optical disc 1. In this state, the structure is made such that the rack 9 moves along a groove formed on the screw shaft 8 by rotating the feed motor 4 in a forward rotating direction or a backward rotating direction, whereby the optical pickup 3 can move in a radial direction of the optical disc 1.

Next, a description will be given of an optical system. The optical system is constituted by light sources having two kinds of different wavelengths and an optical lens system. At first, a light source having a first wavelength is an optical unit 14 emitting a laser beam A having a wavelength 635 to 670 nm (a short wavelength) and integrally forms an optical detector constituted by a semiconductor laser and a light receiving element. Further, a light source having a second wavelength is an optical unit 15 emitting a laser beam B having a wavelength 780 nm (a long wavelength) and integrally forms an optical detector constituted by a semiconductor laser, a diffraction grating generating three beams from the laser beam B, a diffraction grating introducing a reflected beam from the optical disc 1 to the optical detector and a light receiving device.

Further, a volume 16 for adjusting an amount of laser emitting beam of the semiconductor laser within each of the optical units 14 and 15 is provided in each of the optical units 14 and 15. Further, a superposed circuit 17 for applying a superposition to an optical power of the semiconductor laser within the optical unit 14 in the short wavelength side and a shield case 18 covering all the area of the superposed circuit 17 and shielding an unnecessary radiation are arranged in the optical unit 14. The optical unit 15 mounts a high power laser capable of recording and reproducing. Reference numeral 19 denotes a laser driver, in which a superposed circuit for adjusting the amount of emitting light of the optical unit 15 and applying a superposition to the optical power is made IC.

Next, a description will be given of the optical lens system. Reference numeral 20 denotes a beam splitter serving as a light separating means, in which a film transmitting the laser beam A having the wavelength 635 to 670 nm and reflecting the laser beam B having the wavelength 780 nm is formed. Reference numeral 21 denotes a collimator lens A, which is formed so as to convert a diffuse light into a substantially parallel beam to the laser beam A. Reference numeral 22 denotes a collimator lens B, which is formed so as to reduce an angle of diffusion of the diffuse light with respect to the laser beam B.

Further, the light sources of the respective optical units 14 and 15 are arranged so as to achieve the following relation to each other. A position of arrangement of the optical unit 14 is set to a position at which the laser beam A having the wavelength 635 to 670 nm becomes a substantially parallel beam after passing through the collimator lens 21. A distance of an optical path in the air of the optical unit 14 from the laser light source to the collimator lens A21 at this time is set to L1, and a focal distance of the collimator lens A21 is set to F1. On the other hand, a position of arrangement of the optical unit 15 is set to a position at which an angle of diffusion of the diffuse light is reduced after the laser beam B having the wavelength 780 nm passes through the collimator lens B22. That is, the laser beam B is converted into a fine divergent light flux after passing through the collimator lens B22.

An optical distance in the air of the optical unit 15 from the laser light source to the collimator lens B21 at this time is set to L2 and a focal distance of the collimator lens B21 is set to F2. The optical units 14 and 15 at this time are respectively arranged at positions where the respective light sources have a relation $0.55 \leq (L2/F2)/(L1/F1) \leq 0.75$. In accordance with the manner mentioned above, it is possible to align the light sources having the different wavelengths with the different medium thickness (a difference of medium thickness is 0.6 mm) by using a common objective lens 25.

Reference numeral 23 denotes a polarizing hologram, which has a function of diffraction only by any of P and S waves, gives no effect to the laser beam A emitting from the optical unit 14 toward the optical disc 1, gives an effect to the laser beam A reflecting on the recording layer of the optical disc 1 so as to return, and introduces the laser beam A to the optical detector within the optical unit 14. Reference numeral 24 denotes a start-up mirror, which changes directions of optical axes of the laser beams A and B so as to change the optical axis from the optical axis substantially parallel to the optical disc 1 to the optical axis substantially vertical to the optical disc 1 toward the objective lens 25. Reference numeral 45 denotes a reflection mirror 45, which reflects the laser beam A so as to change the optical axis to the optical axis substantially vertical to the collimator lens A21.

The objective lens 25 collects the respective laser beams A and B mentioned above on the recording surface of the optical disc 1. In particular, a numerical aperture (NA) is set to 0.6 so that the laser beam A having the wavelength 635 to 670 nm is collected on the high density optical disc as a beam spot having a diameter of about 1 $\mu$m. Reference numeral 26 denotes an actuator, which is supported so as to freely move the objective lens 25 in a following manner in a focusing direction and a tracking direction with respect to the optical disc 1. Reference numeral 27 denotes an aperture filter, which has a function that a transmission diameter of the laser beam changes in correspondence to the wavelength so that NA corresponds to 0.6 in the laser beam A and NA corresponds to 0.5 in the laser beam B. The aperture filter 27 is mounted on the actuator 26 and is arranged so as to freely move integrally together with the objective lens 25.

These two optical units 14 and 15 (that is, the laser beam A and the laser beam B) are switched in correspondence to the kind of the recording and reproducing optical disc 1. The optical unit 14 is used for the high density optical disc in which a thickness to the recording surface is about 0.6 mm. The optical unit 15 is used for the low density optical disc in which a thickness to the recording surface is about 1.2 mm.

Next, a description will be given of the actuator 26. The objective lens 25 is fixed to an objective lens holder 28 by a means such as an adhesion or the like. The objective lens holder 28 is supported by four wires 29, and another end of each of the wires 29 is fixed and supported to a suspension holder 30. In accordance with the present embodiment, the objective lens holder 28, the wires 29 and the suspension holder 30 are integrally formed.

The objective lens holder 28 has a frame type structure having a circular space portion and a substantially rectangular opening portion, and the objective lens 25 mentioned above is fixed to the circular space portion by an adhesive agent of the like. On the other hand, a focus coil 31 for driving the objective lens 25 in a focusing direction and a tracking coil 32 for driving it in a tracking direction are fixed to respective predetermined positions of the substantially rectangular opening portion by an adhesive agent or the like.

In four wires 29, the focus coil 31 and the tracking coil 32 are connected and fixed to end portions in a side of the objective lens holder 28 by a means such as a soldering or the like, and it is possible to apply an electric current to the focus coil 31 and the tracking coil 32 via the wires 29. Further, another end portion in a side of the suspension holder 30 of each of the wires 29 is connected and fixed to a flexible printed circuit 33 mounted to a side surface (a surface in a vertical direction to a paper surface in FIG. 2) of the suspension holder 30 by a means such as a soldering or the like, and it is possible to apply an electric current to the wires 29 from the flexible printed circuit 33. It is possible to absorb a vibration of the wires 29 by injecting a damper member such as a silicon type gel or the like for damping a vibration between the suspension holder 30 and the wires 29.

Further, a description of the optical system will be added. At first, the DVD optical system is structured such that the recording medium has a high density and a medium information to be detected (a recording pit on the disc) is small and fine. Accordingly, with respect to the laser beam A, the beam is focused to a significantly small spot by utilizing a center portion of a far-field pattern (FFP), thereby detecting the information. Accordingly, the collimator lens A21 is set to have a long focal distance, and the objective lens 25 is designed to be optimum for focusing the laser beam A having the short wavelength to a significantly small spot. In other words, the objective lens 25 functions so as to form a smaller spot than the laser beam B having the long wavelength with respect to the laser beam A having the short wavelength.

On the other hand, in the CD optical system, in order to effectively utilize the optical power necessary for recording, it is made prior to irradiate all of the beam flux of the laser beam B as much as possible onto the recording medium. Further, the recording medium has a low density and the medium information to be detected (a recording pit of the disc) is larger than the DVD optical system. Accordingly, a diameter of the optical spot in the CD optical system is focused to about 1.5 $\mu$m. Accordingly, the objective lens 25 commonly uses, and the collimator lens B22 as the short focal distance.

Figure 4A:
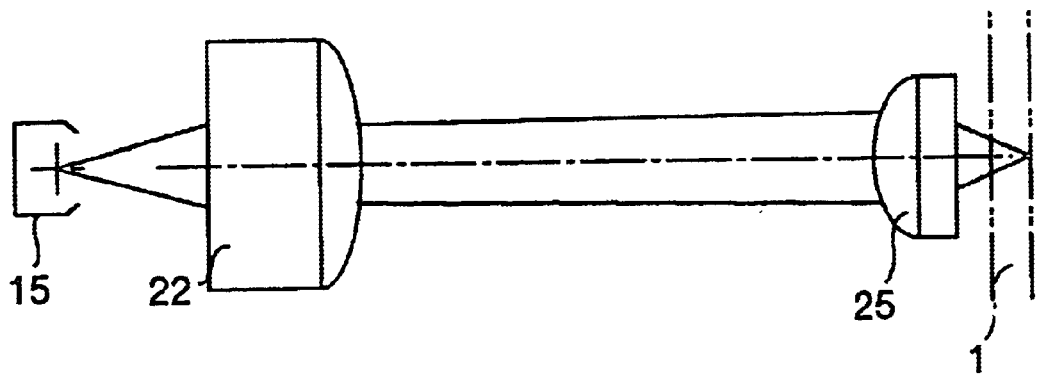
FIG. 4 is a view describing an influence of a tracking shift of an objective lens.
Figure 4B:
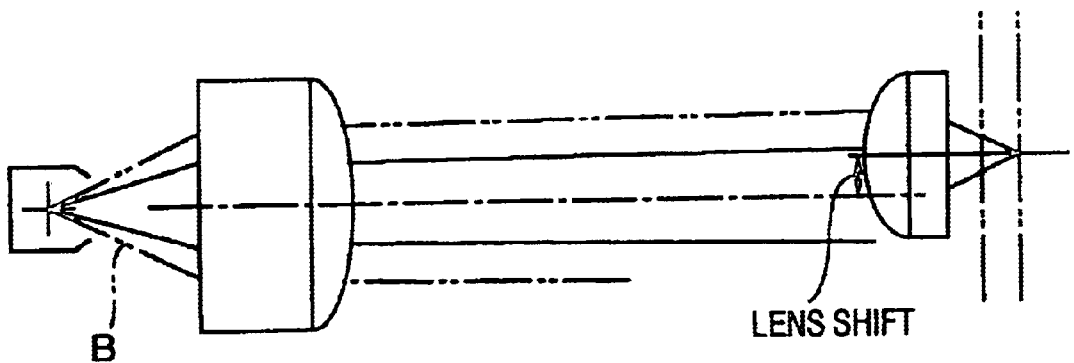

Next, a description will be given of the CD optical system and the collimator lens B22. FIG. 4 is a view describing an influence of a tracking shift of the objective lens 25. In this case, the respective constituting elements are the same as those described in FIG. 1. In FIG. 4, FIG. 4A shows a state that the optical axes coincide and FIG. 4B shows the influence of the objective lens shift (the tracking shift) in a figurative manner.

FIG. 4A shows an ideal optical system maintaining an optical condition on design as mentioned above. FIG. 4B shows a structure in which the center of the objective lens 25 is applied to a lens shift (a tracking shift). In an actual use of the optical disc apparatus, an amount of the lens shift reaches a value on an actual use about ±0.5 mm in some cases. At this time, since the laser beam B entering into the objective lens 25 is the fine divergent light flux as mentioned above, a coma aberration extremely increases in correspondence to the increase of the amount of the lens shift.

Figure 5A:
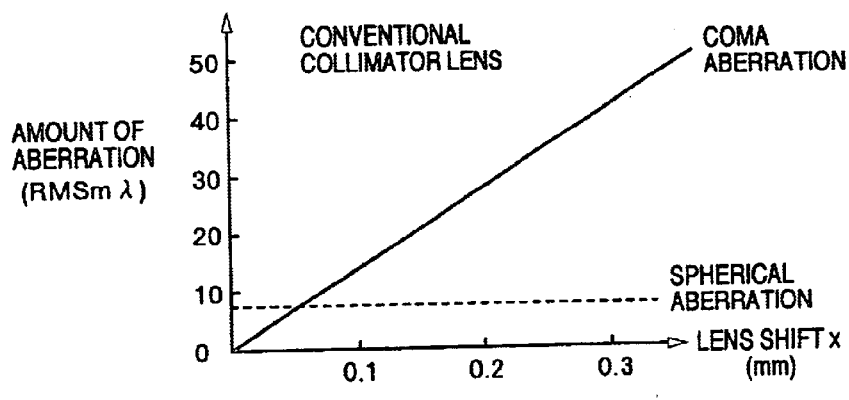
FIG. 5 is a view describing a generation of a coma aberration and an effect of improvement.

A description will be further given of the coma aberration. FIG. 5 is a view describing a generation of the coma aberration and an effect of improvement. FIG. 5A is a view showing the coma aberration of the optical disc 1 and a spherical aberration at a time of executing the lens shift by using the conventional collimator lens B22 (refer to FIG. 4B) for the purpose of comparison. There is shown a state that the coma aberration increased substantially in proportion to the amount of lens shift, in correspondence to an increase of an amount of lens shift (x). With respect to the spherical aberration, a substantially constant aberration is generated without relation to the amount of lens shift.

Figure 5B:
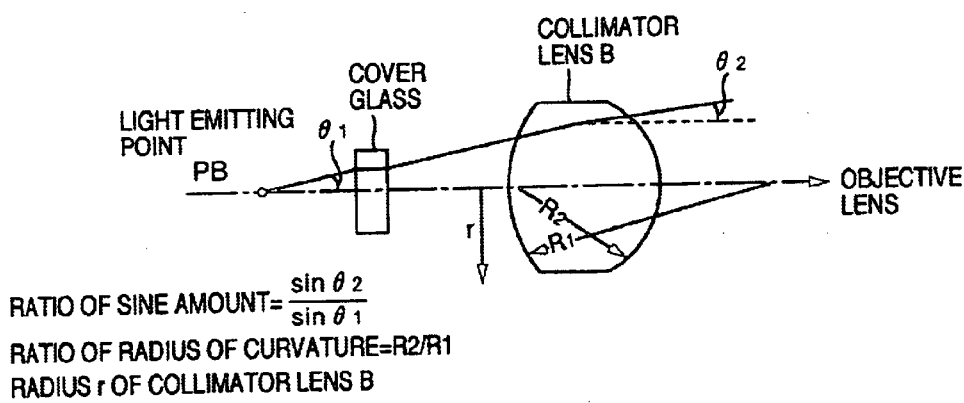

Accordingly, the collimator lens B22 forms a wavefront correcting the coma aberration in correspondence to a diameter (a radius r) of the collimator lens B22, for the purpose of correcting the coma aberration generated due to the lens shift of the objective lens 25. FIG. 5B is a view describing a ratio of sine amount and a ratio of radius of curvature.

In this case, a light emitting point of the laser beam B is set to PB, and an optical member including PBS 38 of the optical unit 15 is totally called as a cover glass. An angle of diffusion of the laser beam B radiating after transmitting through the cover glass from the light emitting point of the laser beam B is set to $\theta 1$ with respect to the optical axis, and a sine amount thereof is set to SIN $\theta 1$. Further, an angle of diffusion of the laser beam B emitting from the collimator lens B22 is set to $\theta 2$ with respect to the optical axis, and as sine amount thereof is set to SIN $\theta 2$. With respect to the collimator lens B22, a radius of curvature of a surface in the side of the light source (a surface opposing to the optical unit 15, that is, an incident surface) is set to R1, and a radius of curvature of a surface in the side of the objective lens 25 (that is, an emitting surface) is set of R2. Then, it is assumed that a ratio SIN $\theta 2$/SIN $\theta 1$ is called as a ratio of sine amount, and a ratio R2/R1 is called as a ratio of radius of curvature.

Figure 5C:
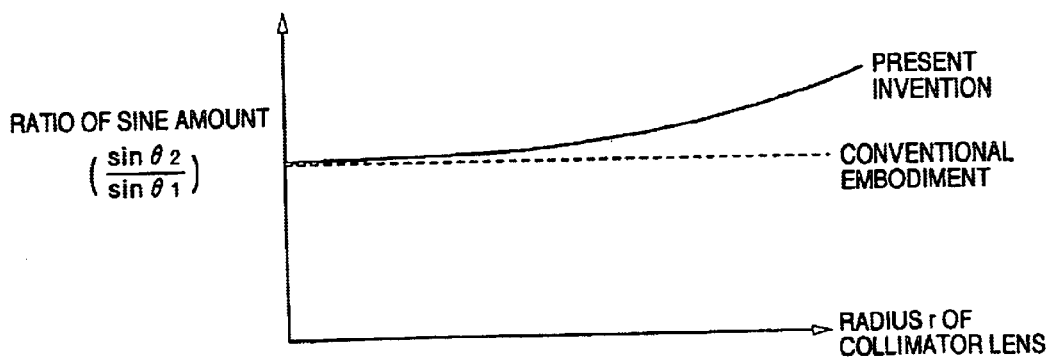

FIG. 5C is a view describing the ratio of sine amount with respect to the laser beam B and the collimator lens B22. A horizontal axis is a radius r of the collimator lens B22 mentioned above. It expresses a position of the radius of the collimator lens and corresponds to a distance apart from the center of the lens to the periphery. A vertical axis is the ratio of the sine amount SIN $\theta 2$/SIN $\theta 1$ mentioned above. In particular, the collimator lens B22 is formed so that the ratio of the sine amount SIN $\theta 2$/SIN $\theta 1$ gradually increases in correspondence to the position of the increased position of the radius (r) of the collimator lens B22 through which the emitting light from the second light source (a light emitting point PB) passes, and an increased amount is substantially in proportion to a square of the radius of the collimator lens B22. Accordingly, the laser beam B forms the fine divergent light which is the same as the conventional one in the center portion of the collimator lens B22, and forms the fine divergent light having the wavefront strongly reverse compensating the coma aberration expressed by the ratio of the sine amount mentioned above as shifting to the peripheral portion of the collimator lens B22.

For the purpose of comparison, the conventional embodiment is shown by a dot line. Generally, in the conventional art, the ratio of the sine amount is set to be substantially uniform without connection to the radius. On the contrary, in accordance with the present invention, the ratio of the sine amount SIN θ2/SIN θ1 gradually increases in correspondence to the increase of the radius, and an increased amount is in proportion to a substantially square of the radius. In other words, the ratio of the sine amount of the collimator lens used for the long wavelength is expressed by the following formula.

$$\text{SIN } \theta2/\text{SIN } \theta1 = \alpha + k1 \cdot r^2$$

Here, α and k1 are fixed values (proportionality factors) selected on the basis of a performance (a characteristic) required in the collimator lens.

Figure 6A:
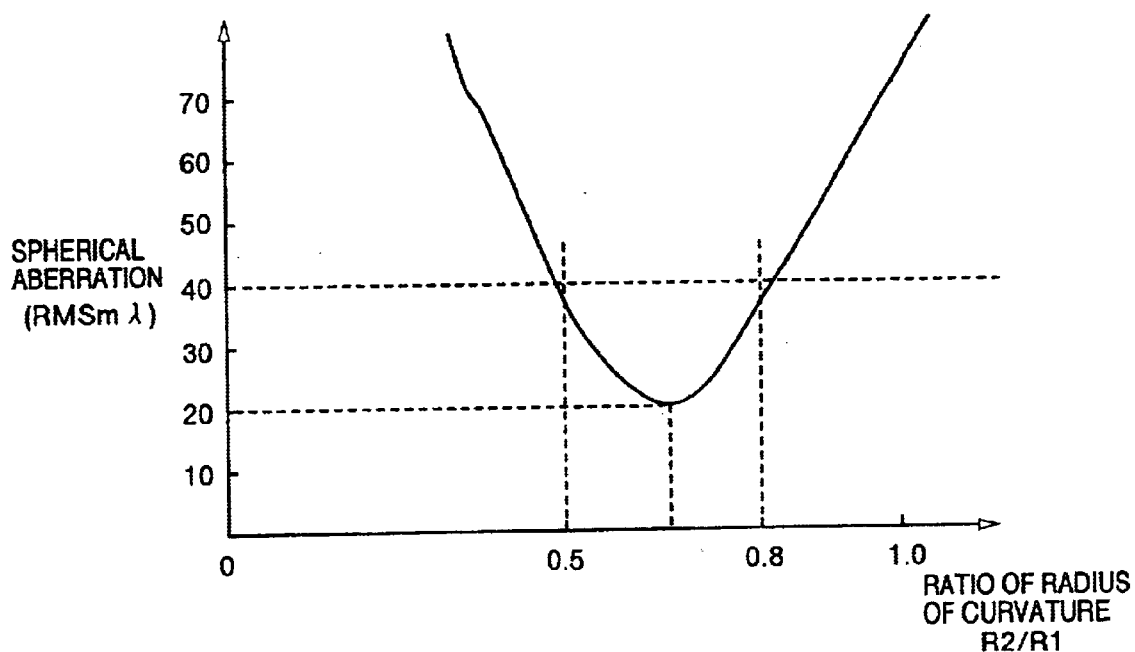
FIG. 6 is a view describing an aberration in the case of using a collimator lens in accordance with the present invention in an optical system having a long wavelength.

Next, a description will be given of a condition of the collimator lens for the purpose that the ratio of the sine amount mentioned above most effectively functions. FIG. 6 is a view describing an aberration in the case of using the collimator lens in accordance with the present invention for the optical system of the long wavelength. FIG. 6A is a view showing a relation between the ratio of the radius of curvature mentioned above and a spherical aberration. A horizontal axis indicates the ratio of the radius of curvature R2/R1 mentioned above. A vertical axis indicates the spherical aberration on the optical axis. Since it is on the optical axis, the lens shift in FIG. 5A is 0. Accordingly, the spherical aberration appears.

In FIG. 6A, the spherical aberration changes in a substantially V shape in correspondence to the ratio of the radius of curvature. When setting an actual limit of the spherical aberration to 40 RMS mλ, an actual range of the ratio of the radius of curvature is between 0.5 and 0.8. Further, a minimum point (that is, an optimum condition) thereof shows a spherical aberration 20 RMD mλ in the ratio of the radius of curvature 0.65. In the manner mentioned above, by reducing the coma aberration generated due to the objective lens shift and setting the generation amount of the spherical aberration generated as a side effect thereby to a range of the ratio of the radius of curvature R2/R1 of the collimator lens surface between 0.5 and 0.8, it is possible to make the generation amount within a range where no problem is actually generated.

Figure 6B:
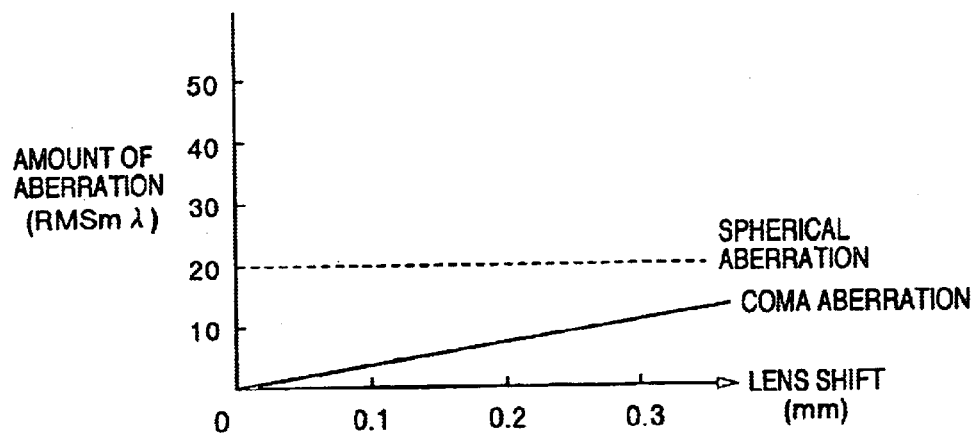

FIG. 6B is a view showing a coma aberration and a spherical aberration of a long wavelength optical system (a CD optical system) at a time of shifting the lens by using the collimator lens B22 in accordance with the present invention (refer to FIG. 4B). The laser beam B emitted from the optical unit 15 is incident to the collimator lens B22, converted into the fine divergent pencil of rays and is formed in a wavefront reverse compensating the coma aberration in correspondence to an expansion toward an outer periphery from a center thereof (refer to FIGS. 5B and 5C).

When the laser beam B mentioned above is incident to the objective lens 25, an amount of the spherical aberration becomes a little greater in comparison with the conventional collimator lens (refer to the spherical aberration in FIGS. 5A and 6B). On the other hand, with respect to the coma aberration due to the lens shift, since the wavefront of the collimator lens B22 against the laser beam B is formed in the wavefront reverse compensating the coma aberration, the coma aberration of the CD optical system is restricted to a size about a quarter in comparison with the conventional collimator when being incident to the optical disc 1 via the objective lens 25 (refer to the coma aberration in FIGS. 5A and 6B). Since a total of the aberration of the long wavelength optical system is given by a sum of the spherical aberration and the coma aberration, it is possible to restrict to a size of the aberration having no actual problem by using the collimator lens B22 in accordance with the present invention.

A description will be given of an operation of the optical pickup apparatus in accordance with the present invention structure in the manner mentioned above. At first, a description will be given of a case of reproducing a signal from the high density optical disc. The laser beams A having the wavelength 635 to 670 nm emitted from the semiconductor laser of the optical unit 14 are reflected by the reflection mirror 45 and are thereafter converted into substantially parallel beams by the collimator lens A21. Further, the laser beams A transmit through each of the polarizing hologram 23, the beam splitter 20 and a λ/4 plate 37, and are reflected by the stand-up mirror 24 so as to change the direction of the laser beam A. Further, after transmitting through the aperture filter 27, the beams are incident to the objective lens 25. The laser beams A are condensed by the objective lens 25 so as to be incident to the high density optical disc 1. Accordingly, the beams form an image on a recording surface positioned at about 0.6 mm in a thickness direction of the high density optical disc 1. The reflected light from the recording surface again transmit through the objective lens 25, are diffracted by the polarizing hologram 23 through a path reverse to that described above, and reach the light receiving device of the optical unit 14. In the manner mentioned above, the recorded information is reproduced by the light receiving device of the optical unit 14.

On the other hand, a description will be given of a case of reproducing the low density optical disc or recording on the low density optical disc. The laser beams B having the wavelength 780 nm emitted from the semiconductor laser of the optical unit 15 are formed in three beams (a main beam for recording and reproducing and two sub beams for controlling are totally called) on the way of transmitting through the diffraction grating provided within the optical unit 15. The laser beams B are converted into the fine divergent light on the way of transmitting through the collimator lens B22 in the manner mentioned above. Further, the laser beams B are reflected by the beam splitter 20, transmit through the λ/4 plate 37 and are again reflected by the stand-up mirror 24 so as to change the direction of the laser beams B. Further, after transmitting through the aperture filter 27, the beams are incident to the objective lens 25. The laser beams B are condensed by the objective lens 25 so as to be incident to the low density optical disc 1. Accordingly, the beams form an image on a recording surface positioned at about 1.2 mm in a thickness direction of the low density optical disc 1. The reflected light from the recording surface again transmit through the objective lens 25, are separated into return lights by a polarized beam splitter (PBS) 38 arranged within the optical unit 15 through a path reverse to that described above, and reach the light receiving device 39 of the optical unit 15. In the manner mentioned above, the recorded information is reproduced by the light receiving device of the optical unit 15 or is recorded by the laser beam B.

At this time, since the collimator lens B22 is formed so as to satisfy the condition of the ratio of the sine amount and the ratio of the radius of curvature described above, the long wavelength optical system shifts the lens in the manner shown in FIG. 4B, it is possible to restrict to a level that an amount of aberration has actually no problem. Accordingly, a jitter caused by the lens shift is not increased, and a tracking error (TE) signal is maintained with high quality. As a result, an accuracy of recording position is improved, an optical power loss is restricted at a time of recording, and an excellent optical pickup apparatus can be obtained.

(Embodiment 2)

Figure 7:
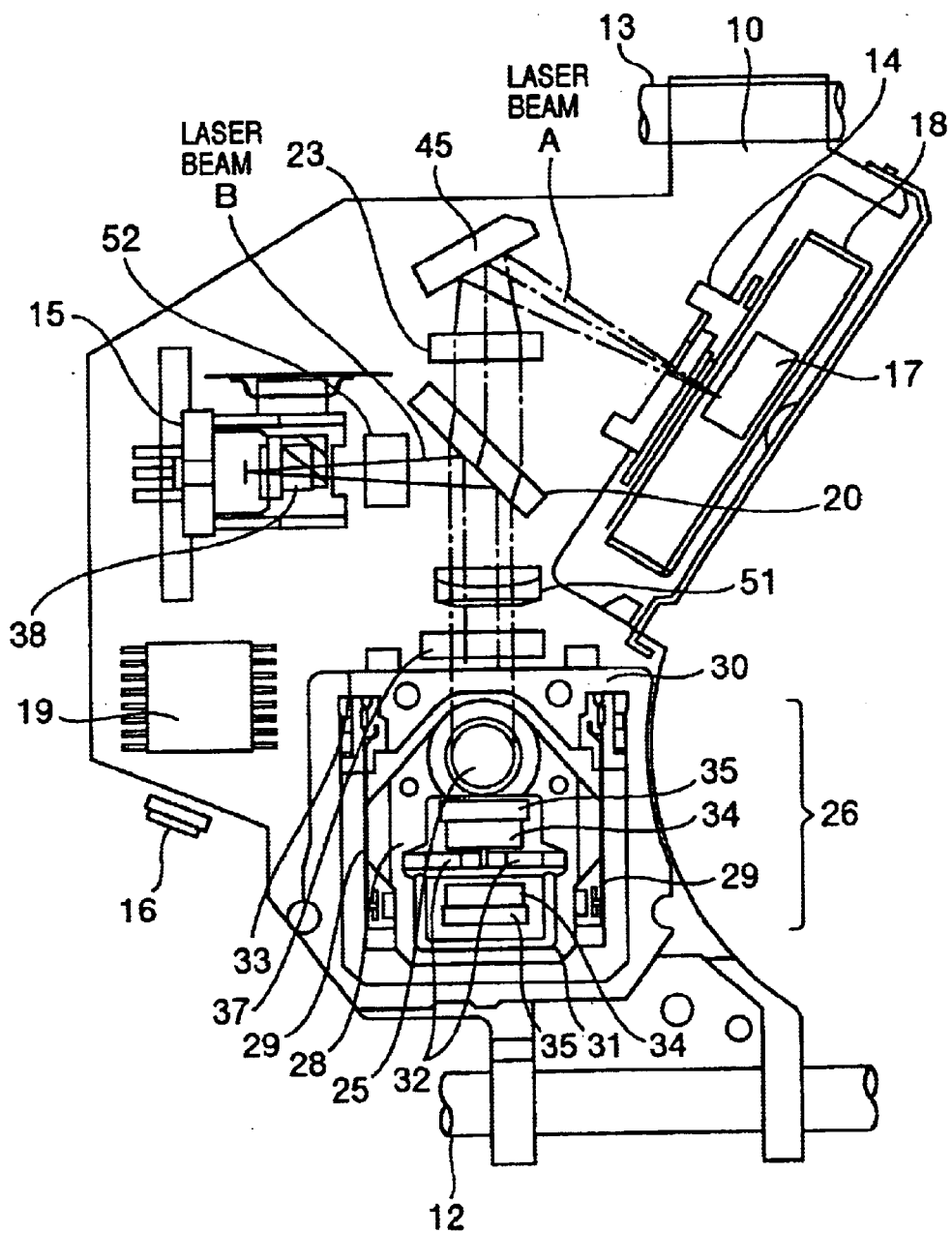
FIG. 7 is a view showing another structure in the optical pickup apparatus in accordance with the present invention.

FIG. 7 is a view showing another structure in the optical pickup apparatus in accordance with the present invention. A difference of FIG. 1 from FIG. 2 in the embodiment 1 exists in a point that the beam splitter 20 is arranged between a collimator lens A51 and the reflection mirror 45, in other words, the collimator lens A51 is arranged in a side close to the objective lens 25 in comparison with the beam splitter 20. Accordingly, the laser beams B emitted from the optical unit 15 pass through the collimator lens B52, are reflected by the beam splitter 20 so as to change a forward moving direction, pass through the collimator lens A51, and thereafter are introduced to the objective lens 25. The laser beams A emitted from the optical unit 14 transmit through the optical devices in a different order from that of the embodiment 1. In this case, a description will be given of the collimator lens A51 and a collimator lens B52 later. Since except the different points mentioned above, the structures and the functions of the respective optical devices are the same as those of the optical pickup apparatus described in the embodiment 1, the same reference numerals are attached to the same elements as those of the embodiment 1 and an overlapping description will be omitted.

FIG. 8 is a view describing a long wavelength optical structure in accordance with the present invention. In a short wavelength optical system in accordance with the present embodiment, in the same manner as that of the embodiment 1, the collimator lens A51 is set to have a long focal distance, and the objective lens 25 is designed in an optimum manner so as to focus the laser beam A having the short wavelength on an extremely small spot. Since the short wavelength optical system is designed in an optimum manner as mentioned above, it is the same as that described in the embodiment 1 and FIG. 5A in view of the point that the coma aberration is generated substantially in proportion to the lens shift amount when shifting the lens in the long wavelength optical system.

Figure 8A:
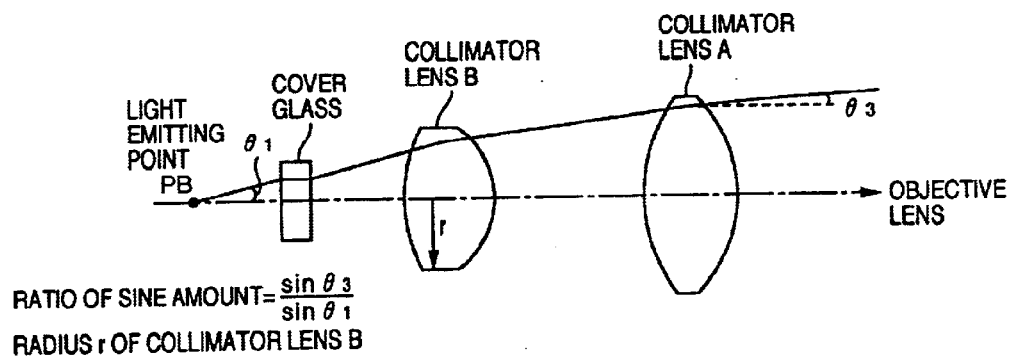
FIG. 8 is a view describing an optical structure having a long wavelength in accordance with the present embodiment.

Then, the collimator lens B52 in accordance with the embodiment 2 forms the wavefront compensating the coma aberration generated at a time of shifting the objective lens 25 in the same manner as the embodiment 1. FIG. 8A is a view describing ratio of sine amount of the collimator lens B. In this case, a light emitting point of the laser beam B is set to PB, and an optical member including PBS 38 of the optical unit 15 is totally called as a cover glass. An angle of diffusion of the laser beam B radiating after transmitting through the cover glass from the light emitting point of the laser beam B is set to θ1 with respect to the optical axis, and a sine amount thereof is set to SIN θ1.

Further, an angle of diffusion of the laser beam B emitting from the collimator lens A51 through the collimator lens B52 is set to θ3 with respect to the optical axis, and as sine amount thereof is set to SIN θ3. At this time, since the collimator lens A51 is set to the condition of the short wavelength optical system in an optimum manner, the collimator lens B52 is formed so that a result obtained by the fact that the laser beams B transmit through the collimator lens B52 and the collimator lens A51 satisfies the condition mentioned above. Then, a ratio SIN θ3/SIN θ1 is called as a ratio of sine amount.

Figure 8B:
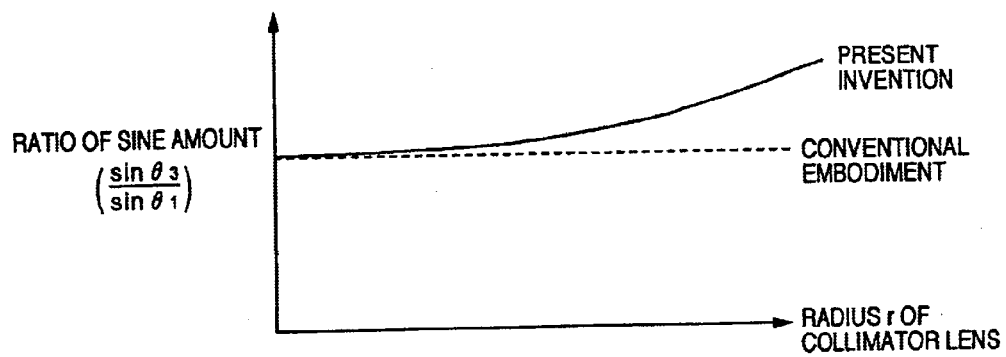

FIG. 8B is a view describing the ratio of sine amount. In the same manner as that of FIG. 5C, it shows a change of the ratio of the sine amount SIN θ3/SIN θ1 mentioned above caused by the radial position of the collimator lens B52. For reference, the ratio of the sine amount in accordance with the conventional art is shown by a dotted line. In particular, the collimator lens B52 is formed so that the ratio of the sine amount SIN θ3/SIN θ1 gradually increases in correspondence to the position of the increased position of the radius (r) of the collimator lens B52 through which the emitting light from the second light source (a light emitting point PB) passes, and an increased amount is substantially in proportion to a square of the radius of the collimator lens B52. In other words, the ratio of the sine amount of the collimator lens used for the long wavelength is expressed by the following formula.

SIN θ3/SIN θ1=β+k2·r²

Here, β and k2 are fixed values (proportionality factors) selected on the basis of a performance (a characteristic) required in the collimator lens.

Figure 8C:
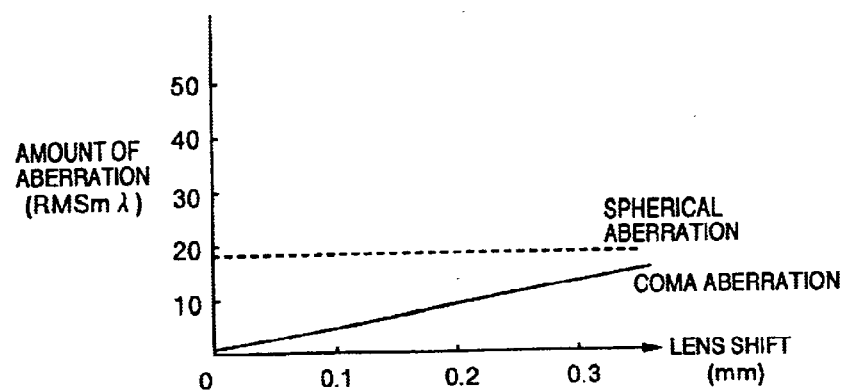

FIG. 8C is a view showing a coma aberration and a spherical aberration of a long wavelength optical system (a CD optical system) at a time of shifting the lens by using the collimator lens B52 in accordance with the present invention (refer to FIG. 4B). The laser beam B emitted from the optical unit 15 is incident to the collimator lens A51 via the collimator lens B52, converted into the fine divergent pencil of rays and is formed in a wavefront reverse compensating the coma aberration in correspondence to an expansion toward an outer periphery from a center thereof (refer to FIGS. 8B and 8C).

When the laser beam B mentioned above is incident to the objective lens 25, an amount of the spherical aberration becomes a little greater in comparison with the conventional collimator lens (refer to the spherical aberration in FIGS. 5A and 8C). On the other hand, with respect to the coma aberration due to the lens shift, since the wavefront of the collimator lens B52 against the laser beam B is formed in the wavefront reverse compensating the coma aberration, the coma aberration of the CD optical system is restricted to a size about a quarter in comparison with the conventional collimator when being incident to the optical disc 1 via the objective lens 25 (refer to the coma aberration in FIGS. 5A and 8C). Since a total of the aberration of the long wavelength optical system is given by a sum of the spherical aberration and the coma aberration, it is possible to restrict to a value equal to or less than one fourth of the conventional one, that is, a size of the aberration having no actual problem by using the collimator lens B52 in accordance with the present invention.

In particular, since the collimator lens A51 (the long focal distance collimator lens) is arranged close to the objective lens 25 in comparison with the optical structure described in the embodiment 1 by employing the optical structure in accordance with the present embodiment 2, it is possible to make the structure of the whole of the pickup apparatus more compact.

Since the operation of the optical pickup apparatus in accordance with the embodiment 2 of the present invention structured in the manner mentioned above is the same as the operation described in the embodiment 1, an overlapping description will be omitted.

As mentioned above, in accordance with the present invention, the generation of the coma aberration is restricted even when the objective lens is shifted, so that the jitter caused by the lens shift is not increased, and the tracking error (TE) signal is maintained with high quality. As a result, the recording position accuracy is improved, the optical power loss at a time of recording is restricted, and an excellent optical pickup apparatus can be obtained.

What is claimed is:

1. An optical pickup apparatus for recording or reproducing information on or from an optical disc, said apparatus comprising:

a light source radiating a laser beam;

an optical detector detecting reflected light from the optical disc;

a collimator lens converting the radiated light of said light source into a fine divergent pencil of rays; and an objective lens that focuses said rays on said optical disc, wherein:

said collimator lens has a surface that is curved to form a wavefront shape that increasingly corrects a coma aberration of the radiated light in correspondence to a radial distance between a center of the collimator lens and a position at which said radiated light intersects said collimator lens and a ratio of sine amount (SIN $\theta_2$/SIN $\theta_1$) between a sine amount (SIN $\theta_1$) of the radiated light from said light source with respect to an optical axis and a sine amount (SIN $\theta_2$) of the light after radiating through said collimator lens with respect to the optical axis increases in substantial proportion to a square of said radial distance.

2. An optical disc apparatus characterized by using the optical pickup apparatus as claimed in claim 1.

3. An optical pickup apparatus for recording or reproducing information on or from an optical disc, said apparatus comprising:

a first light source radiating a laser beam having a first wavelength;

a first detector detecting reflected light from the optical disc;

a second light source radiating a laser beam having a second wavelength longer than said first wavelength;

a second detector detecting reflected light from the optical disc;

a light separator introducing the laser beam having said first wavelength and the laser beam having said second wavelength to the substantially same optical aria;

an objective lens functioning so as to form a smaller spot from the laser beam having said first wavelength than from the laser beam having said second wavelength;

a first collimator lens converting the radiated light of said first light source into a substantially parallel beam; and a second collimator lens converting the radiated light of said second light source into a fine divergent pencil of rays, wherein:

said second collimator lens has a surface that is curved to form a wavefront shape that increasingly corrects a coma aberration of the radiated light of said second light source in correspondence to a radial distance between a center of said second collimator lens and a position at which the radiated light of said second light source intersects said second collimator lens and a ratio of sine amount (SIN $\theta_2$/SIN $\theta_1$) between a sine amount (SIN $\theta_1$) of the radiated light from said second light source with respect to the optical axis and a sine amount (SIN $\theta_2$) of the light after radiating through said second collimator lens with respect to the optical axis increases in substantial proportion to a square of said radial distance.

4. An optical pickup apparatus as claimed in claim 3, wherein with respect to said second collimator lens, a ratio of a radius of curvature (R2/R1) corresponding to a ratio between a radius of curvature R1 of the incident surface and a radius of curvature R2 of the radiating surface is within a range between 0.5 and 0.8.

5. An optimal disc apparatus characterized by using the optical pickup apparatus as claimed in claim 3.

6. An optical pickup apparatus for recording or reproducing information on or from an optical disc, said apparatus comprising:

a first light source radiating a laser beam having a first wavelength;

a first detector detecting reflected light from the optical disc;

a second light source radiating a laser beam having a second wavelength longer than said first wavelength;

a second detector detecting reflected light from the optical disc;

a light separator introducing the laser beam having said first wavelength and the laser beam having said second wavelength to the substantially same optical axis;

an objective lens functioning so as to form a smaller snot from the laser beam having said first wavelength than from the laser beam having said second wavelength;

a first collimator lens converting the radiated light of said first light source into a substantially parallel beam; and a second collimator lens converting the radiated light of said second light source into a fine divergent pencil of rays, wherein:

said second collimator lens has a surface that is curved to form a wavefront shape that increasingly corrects a coma aberration of the radiated light of said second light source in correspondence to a radial distance between a center of said second collimator lens and a position at which the radiated light of said second light source intersects said second collimator lens, and with respect to said second collimator lens, a ratio of a radius of curvature (R2/R1) corre-sponding to a ratio between a radius of curvature R1 of the incident surface and a radius of curvature R2 of the radiating surface is within a range between 0.5 and 0.8.

7. An optical pickup apparatus for recording or reproducing information on or from am optical disc, said apparatus comprising:

a first light source radiating a laser beam having a first wavelength;

a first detector detecting reflected light from the optical disc;

a second light source radiating a laser beam having a second wavelength longer than said first wavelength;

a second detector detecting reflected light from the optical disc;

a light separator introducing the laser beam having said first wavelength and the laser beam having said second wavelength to the substantially same optical axis;

an objective lens functioning so as to form a smaller spot from the laser beam having said first wavelength than from the laser beam having said second wavelength;

a first collimator lens converting the radiated light of said first light source into a substantially parallel beam; and a second collimator lens converting the radiated light of said second light source into a fine divergent pencil of rays, wherein:

the radiated light of said second light source forms an optical path reaching said objective lens through said second collimator lens and said light separating means, and said second collimator lens has a surface that is curved to form a wavefront shape that increasingly corrects a coma aberration of the radiated light of said second light source in correspondence to a radial distance between a center at the second collimator lens and a position at which the radiated light of said second light source intersects said second collimator lens and a ratio of sine amount (SIN $\theta_2$/SIN $\theta_1$) between a sine amount (SIN $\theta_1$) of the radiated light from said second light source with respect to the optical axis and a sine amount (SIN $\theta_2$) of the light after radiating through said second collimator lens with respect to the optical axis increases in substantial proportion to a square of said radial distance.

8. An optical pickup apparatus as claimed in claim 7, wherein with respect to said second collimator lens, a ratio of a radius of curvature (R2/R1) corre-sponding to a ratio between a radius of curvature R1 of the incident surface and a radius of curvature R2 of the radiating surface is within a range between 0.5 and 0.8.

9. An optical disc apparatus characterized by using the optical pickup apparatus as claimed in claim 7.

10. An optical pickup apparatus for recording or reproducing information on or from an optical disc, said apparatus comprising:

a first light source radiating a laser beam having a first wavelength;

a first detector detecting reflected light from the optical disc;

a second light source radiating a laser beam having a second wavelength larger than said first wavelength;

a second detector detecting reflected light from the optical disc;

a light separator introducing the laser beam having said first wavelength and the laser beam having said second wavelength to the substantially same optical axis;

an objective lens functioning to form a smaller spot from the laser beam having said first wavelength than from the laser beam having said second wavelength;

a first collimator lens converting the radiated light of said first light source into a substantially parallel beam; and a second collimator lens converting the radiated light of said second light source into a fine divergent pencil of rays, wherein:

the radiated light of said second light source forms an optical path reaching said objective lens through said second collimator lens and said light separating means, said second collimator lens has a surface that is curved to form a wavefront shape that increasingly corrects a coma aberration of the radiated light of said second light source in correspondence to a radial distance between a center of the second collimator lens and a position at which the radiated light of said second light source intersects said second collimator lens and with respect to said second collimator lens, a ratio of a radius of curvature (R2/R1) corre-sponding to a ratio between a radius of curvature R1 of the incident surface and a radius of curvature R2 of the radiating surface is within a range between 0.5 and 0.8.

11. An optical pickup apparatus for recording or reproducing information on or from an optical disc, said apparatus comprising:

a first light source radiating a laser beam having a first wavelength;

a first detector detecting reflected light from the optical disc;

a second light source radiating a laser beam having a second wavelength longer than said first wavelength;

a second detector detecting reflected light from the optical disc;

a light separator introducing the laser beam having said first wavelength and the laser beam having said second wavelength to the substantially same optical axis;

an objective lens functioning so as to form a smaller spot from the laser beam having said first wavelength than from the laser beam having said second wavelength;

a first collimator lens converting the radiated light of said first light source into a substantially parallel beam; and a second collimator lens converting the radiated light of said second light source into a fine divergent pencil of rays, wherein:

the radiated light of said second light source forms an optical path reaching said objective lens through said second collimator lens, said light separating means and said first collimator lens, and said second collimator lens has a surface that is curved to form a wavefront shape that increasingly corrects a coma aberration of the radiated light of said second light source in correspondence to a radial distance between a center of the second collimator lens and a position at which the radiated light of said second light source intersects said second collimator lens and a ratio of sine amount (SIN $\theta_3$/SIN $\theta_1$) between a sine amount (SIN $\theta_1$) of the radiated light from said second light source with respect to the optical axis and a sine amount (SIN $\theta_3$) of the radiated light from said second light source after radiating through said first collimator lens with respect to the optical axis increases in substantial proportion to a square of said radial distance.

12. An optical disc apparatus characterized by using the optical pickup apparatus as claimed in claim 11.

* * * * *